United States Patent [19]

Meuschke

[11] Patent Number: 4,772,446
[45] Date of Patent: Sep. 20, 1988

[54] GRIPPER ASSEMBLY FOR INSERTING AND REMOVING BURNABLE ABSORBER RODS AND THIMBLE PLUGS IN A NUCLEAR REACTOR FUEL ASSEMBLY

[75] Inventor: Robert E. Meuschke, Pittsburgh, Pa.
[73] Assignee: Westinghouse Electric Corp., Pittsburgh, Pa.
[21] Appl. No.: 932,244
[22] Filed: Nov. 19, 1986
[51] Int. Cl.⁴ ............................................. G21C 19/10
[52] U.S. Cl. .................................. 376/262; 376/261; 294/86.25; 294/906; 29/235; 29/723
[58] Field of Search ............... 376/261, 260, 271, 268, 376/264, 262, 270, 446; 29/723, 235, 282, 400 N, 426.1, 426.6; 414/146; 294/906, 86.12, 86.17, 86.25

[56] References Cited

U.S. PATENT DOCUMENTS

| | | | |
|---|---|---|---|
| 3,179,569 | 4/1965 | Fortescue et al. | 376/270 |
| 3,904,048 | 9/1975 | Van Santen et al. | 376/271 |
| 4,015,325 | 4/1977 | Theobald et al. | 29/235 |
| 4,244,616 | 1/1981 | Buchalet | 294/906 |
| 4,259,153 | 3/1981 | Pryamilov et al. | 414/146 |
| 4,269,558 | 5/1981 | Coppa et al. | 294/906 |
| 4,374,801 | 2/1983 | Albin | 294/906 |
| 4,551,299 | 11/1985 | Shields | 376/261 |
| 4,651,400 | 3/1987 | Shields | 29/723 |
| 4,664,874 | 5/1987 | Shallenberger et al. | 29/235 |
| 4,684,499 | 8/1987 | Gjertsen et al. | 376/261 |

Primary Examiner—Deborah L. Kyle
Assistant Examiner—Daniel Wasil
Attorney, Agent, or Firm—D. C. Abeles

[57] ABSTRACT

Apparatus for releasably engaging an elongated member that is releasably connected to the top nozzle of a nuclear reactor fuel assembly. The top nozzle has an adapter plate disposed at its lower end having at least one passageway therethrough through which the elongated member is disposed. The elongated member has a releasable latching structure at one end that is able to be engaged by the apparatus, having at least one latching member movable between a latched position in which the latching member is able to engage said adapter plate and secure the absorber rod in a stationary relationship with respect to the adapter plate and an unlatched position in which the latching member is able to disengage from said adapter plate so that the elongated member be removed from the fuel assembly. The apparatus comprises a hollow releasing member for moving the latching member of the latching structure between its latched position and its unlatched position, an engaging member connected to the releasing member and extending downwardly through the hollow portion of the releasing member, and an actuating member extending downwardly through the hollow portion of the releasing member and coacting with the engaging member to releasably engage the latching structure.

16 Claims, 8 Drawing Sheets

GRIPPER ASSEMBLY FOR INSERTING AND REMOVING BURNABLE ABSORBER RODS AND THIMBLE PLUGS IN A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "Standardized Reduced Length Burnable Absorber Rods for a Nuclear Reactor" by Barry R. Cooney et al. assigned U.S. Ser. No. 718,902 and filed Apr. 1, 1985.

2. "Burnable Absorber Rod Push Out Attachment Joint" by Joseph B. Mayers et al., assigned U.S. Ser. No. 774,850 and filed Sept. 12, 1985.

3. "Nuclear Reactor Fuel Assembly With a Removable Top Nozzle" by John M. Shallenberger et al., assigned U.S. Ser. No. 644,758 and filed Aug. 27, 1984, now U.S. Pat. No. 4,631,168.

4. "Improved Guide Thimble Captured Locking Tube in a Reconstitutable Fuel Assembly" by Robert K. Gjertsen et al., assigned U.S. Ser. No. 775,208 and filed Sept. 12, 1985, now U.S. Pat. No. 4,684,500.

5. "Burnable Absorber Rod Releasable Latching Structure" by Robert K. Gjertsen, assigned U.S. Ser. No. 807,142 and filed Dec. 10, 1985, now U.S. Pat. No. 4,684,499.

BACKGROUND OF THE INVENTION

The present invention relates to an apparatus for insertion and removal of releasable burnable absorber rods from the adapter plate of the top nozzle of a nuclear reactor fuel assembly.

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of fuel assembly, also provide channels for insertion of the neutron absorber control rods within the reactor core. The level of neutron flux and thus the heat output of the core is normally regulated by the movement of the control rods into and from the guide thimbles.

Also, it is conventional practice to design an excessive amount of neutron flux into the reactor core at start-up so that as the flux is depleted over the life of the core there will still be sufficient reactivity to sustain core operation over a long period of time. In view of this practice, in some reactor applications burnable absorber or poison rods are inserted within the guide thimbles of some fuel assemblies to assist the control rods in the guide thimbles of other fuel assemblies in maintaining the neutron flux or reactivity of the reactor core relatively constant over its lifetime. The burnable poison rods, like the control rods, contain neutron absorber material. They differ from the control rods mainly in that they are maintained in stationary positions within the guide thimbles during their period of use in the core. The overall advantages to be gained in using burnable poison rods at stationary positions in a nuclear reactor core are described in U.S. Pat. Nos. to Rose (3,361,857) and to Wood (3,510,398).

Also, the availability of assemblies of burnable absorber rods on a rapid response basis is required at reactor fuel reload time. The present design of the burnable absorber assemblies, being similar to those illustated and described in the first two patent applications cross-referenced above, includes a plurality of precisely spaced apart absorber rods and thimble plugs fastened at their upper ends to a support plate which also mounts a central hold-down device. In view of the multiplicity of components which make up the absorber assemblies and the precise spacing required between them when they are assembled together, it has been found necessary to assemble the absorber assemblies at a manufacturing facility located remote from the reactor site. The final absorber assemblies are then shipped with the fuel assemblies to the reactor site. This means that the particular absorber assembly design must be specified well in advance of the time of actual reload.

A burnable absorber assembly in which the burnable absorber rods have a releasable latching structure is illustrated and described in the fifth patent application cross-referenced above. The advantage of the releasable latching structure is that the configuration of the burnable absorber rods can be specified at the latest possible time because the assembly does not have to include the burnable absorber rods until it is installed. Thus, the nuclear reload design can be fine tuned based on the latest reactor operations input. The ultimate absorber assembly specified may advantageously include, for example, twelve burnable absorber rods and twelve thimble plugs per assembly or other combinations of absorber rods and thimble plugs.

Consequently, a need exists for a device that can be used to insert and remove the burnable absorber rods and thimble plugs from the burnable absorber assembly.

SUMMARY OF THE INVENTION

The present invention provides apparatus for releasably engaging an elongated member, such as a burnable absorber rod or a thimble plug, that is releasably connected to the top nozzle of a nuclear reactor fuel assembly. The top nozzle has an adapter plate disposed at its lower end having at least one passageway therethrough through which the elongated member is disposed. The elongated member has a releasable latching structure at one end that is able to be engaged by the apparatus having at least one latching member movable between a latched position in which the latching member is able to engage said adapter plate and secure the absorber rod in a stationary relationship with respect to the adapter plate and an unlatched position in which the latching member is able to disengage from said adapter plate so that the elongated member be removed from the fuel assembly. The apparatus comprises a hollow releasing member for moving the latching member of the latching structure between its latched position and its unlatched position, an engaging member connected to the releasing member and extending downwardly through the hollow portion of the releasing member, and an actuating member extending downwardly through the hollow portion of the releasing member and coacting with the engaging member to releasably engage the latching structure.

More particularly, the present invention enables a plurality of such elongated members to be inserted or removed from a nuclear reactor fuel assembly and comprises a frame and first and second plates disposed within the frame, the second plate disposed below and spaced apart from the first plate. At least one of the first and second plates is capable of vertical movement relative to the other. The apparatus includes means for moving the frame toward and away from the fuel assembly and means for moving the first and second plates within the frame toward and away from the adapter plate of the top nozzle of the fuel assembly. The apparatus thus includes means for varying the vertical distance between the first and second plates between a first distance and a decreased second distance. Means associated with the first and second plates maintains the first and second plates in a position whereby the vertical distance between said plates is the second distance. Further, the apparatus includes a hollow releasing member extending downwardly from the second plate for moving the latching member of the latching structure between its latched position and its unlatched position, an engaging member connected to the releasing member and extending downwardly from the second plate through the hollow portion of the releasing member, and an actuating member extending downwardly from the first plate through the hollow portion of the releasing member and coacting with the engaging member to releasably engage the latching structure when the vertical distance between the first and second plates is the second distance.

The present invention coacts with the releasable latching structure that secures the burnable absorber rods and thimble plugs to the top nozzle adapter plate of a nuclear reactor fuel assembly so that the final arrangement of the absorber rods and thimble plugs can be specified at the reactor site. Thus, the latest reactor operating information can be considered when determining the arrangement of the absorber rods and thimble plugs in the design of the fuel assembly. The approach avoids the need for off site manufacturing of the final absorber rod and thimble plug assemblies. Instead, an inventory of individual absorber rods and thimble plugs can be sent to the reactor site prior to fueling the reactor. Once the design of the fuel assembly is specified, the configuration of the absorber rods and thimble plugs can be inserted in the fuel assembly. Later, the spent absorber rods can easily be released from the top nozzle adapter plate and replaced.

These and other advantages and attainments of the present invention will become apparent to those skilled in the art upon reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1:
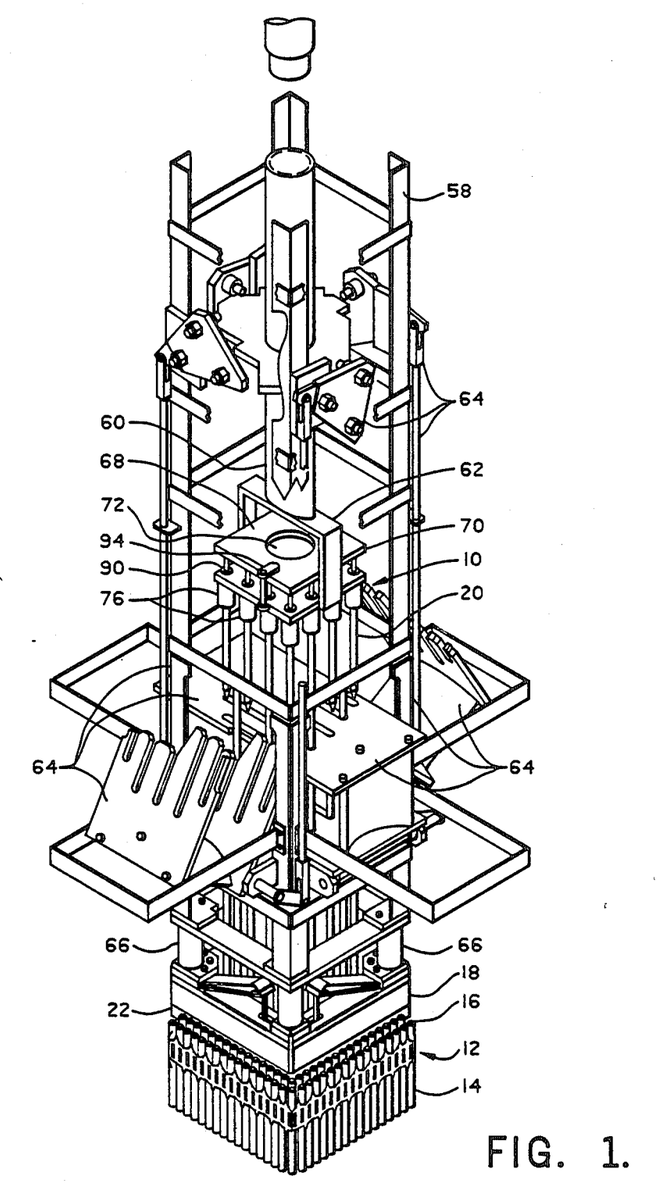
FIG. 1 is a side elevational view of a gripper assembly, constructed in accordance with the present invention, disposed above a nuclear reactor fuel assembly illustrating the gripper assembly in a raised position gripping absorber rods.
Figure 2:
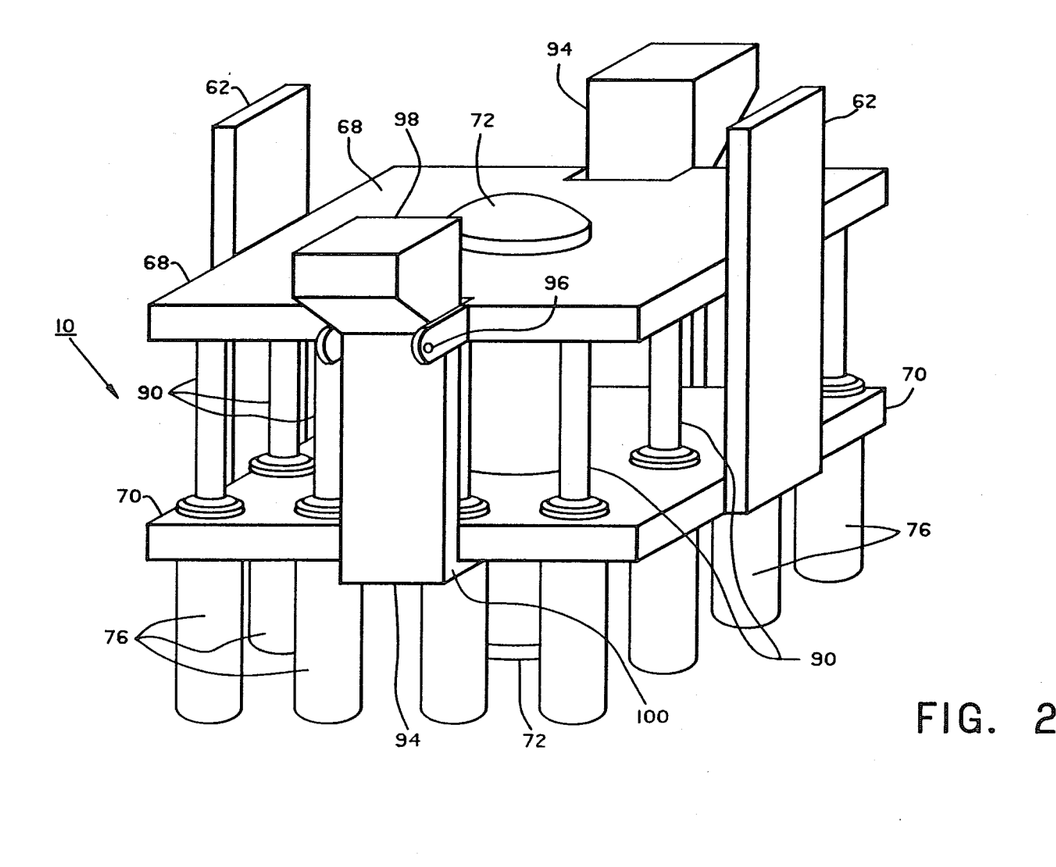
FIG. 2 is an enlarged side elevational view of a portion of the gripper assembly of FIG. 1.

Referring now to the drawings, and particularly to FIG. 1, there is shown an elevational view of a gripper assembly 10 of the invention disposed above a nuclear reactor fuel assembly 12, represented in vertically foreshortened form. The fuel assembly 12 includes a number of longitudinally extending guide tubes or thimbles 14 which project upwardly from a bottom nozzle (not shown). The assembly 12 further includes an organized array of elongated fuel rods 16 transversely spaced and supported by axially spaced transverse grids. The assembly 12 has a top nozzle 18 removably attached to the upper ends of the guide thimbles 14 to form an integral assembly capable of being conventionally handled without damaging the assembly parts.

As mentioned above, the fuel rods 16 in the array thereof in the fuel assembly 12 are held in spaced relationship with one another by grids spaced along the fuel assembly length. Each fuel rod 16 includes nuclear fuel pellets and the opposite ends of the rod are closed by upper and lower end plugs to hermetically seal the rod. The fuel pellets, composed of fissile material, are responsible for creating the reactive power of the nuclear reactor. A liquid moderator/coolant such as water, or water containing boron, is pumped upwadly through the fuel assemblies of the core in order to extract heat generated therein for the production of useful work.

In the operation of a nuclear reactor, it is common practice to provide an excess of reactivity initially in the reactor core and, at the same time, provide means to maintain the reactivity relatively constant over its lifetime. Such means commonly takes the form of control rods (not shown) supported for movement into the guide thimbles of some fuel assemblies in the core and burnable absorber rods 20 supported stationarily in the guide thimbles 14 of other fuel assemblies in the core. The stationary absorber rods 20 assist the movable control rods in maintaining a substantially constant level of neutron flux or reactivity in the core throughout its operating cycle. Before describing the means of the present invention for releasably engaging a burnable absorber rod, the means for stationarily attaching the burnable absorber rods 20 to the top nozzle 18 will be briefly described.

As illustrated in FIGS. 3, 6, 7 and 8, the top nozzle 18 includes a lower adapter plate 22 having a plurality of passageways 24 (only one being shown) formed therethrough. Each guide thimble 14 has its uppermost end portion coaxially positioned within one passageway 24 in the adapter plate 22 and is removably connected to the adapter plate 22 by attaching structure 26, which provides a plurality of structural joints between the top nozzle 18 and the guide thimbles 14 of the fuel assembly skeleton. The attaching structure 26 is generally the same as illustrated and described in U.S. Pat. Nos. 4,631,500 and 4,684,500 cross-referenced above.

Absorber rods 20 are disposed within guide thimbles 14 and extend through passageways 24 of adapter plate 22. The absorber rods 20 are releasably secured to adapter plate 22 by releasable latching structures 28. Releasable latching structure 28 is more fully described in U.S. Pat. No. 4,684,499 cross-referenced above, but will be described herein to the extent necessary to facilitate an understanding of the present invention.

Releasable latching structure 28 includes a generally cylindrical mounting body 30 (FIGS. 3, 4 and 5) and a generally cylindricaly spring latch 32. The mounting body 30 is composed of a generally cylindrical lower plug portion 34 attached to and sealing the upper end of the absorber rod 20 and a generally cylindrical upper end portion 36 having an annular circumferential groove 38 defined thereabout. An undercut cavity 40 formed in the uppermost surface of the upper end portion 36 of the mounting body 30 is configured to receive the gripper assembly 10 of the invention for use in the insertion and removal of the absorber rods 20 from guide thimbles 14. The mounting body 30 has a generally conical configuration tapering inwardly from the upper end portion 36 to the lower plug portion 34 so as to define a tapering recessed void region 42, which surrounds the mounting body 30 at the middle portion thereof. Mounting body 30 has a plurality, preferably four, circumferentially spaced projections 44 disposed at 90 degree intervals about its lower end just above plug portion 34. Projections 44 are designed to extend over the top surface of adapter plate 22 when an absorber rod 20 is disposed within a guide thimble 14.

Figure 5:
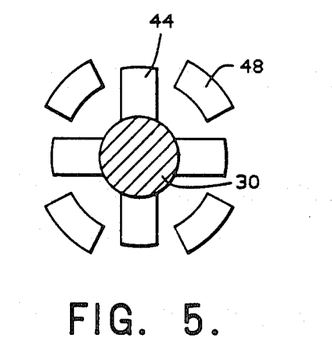
FIG. 5 is a sectional view of the mounting body of the releasable latching structure taken along line FIG. 5—FIG. 5 of FIG. 4.

The spring latch 32 of the latching structure 28 is composed of a generally cylindrical outer ring portion 46 disposed about the upper end portion 36 of the mounting body 30 and a plurality, preferably four, circumferentially spaced latch fingers 48 connected at their upper ends to the outer ring portion 46 in cantilever fashion and extending downwardly therefrom along the mounting body 30. Latching fingers 48 are disposed at 90 degree intervals and extend downwardly between projections 44 (FIG. 5). The outer ring portion 46 has an annular circumferential groove 50 associated annular circumferential bulge 52 defined therein. Circumferential bulge 52 coacts with to the circumferential groove 38 in the upper end portion 36 of latching structure 28 so as to connect the spring latch 32 to the mounting body 30.

Figure 3:
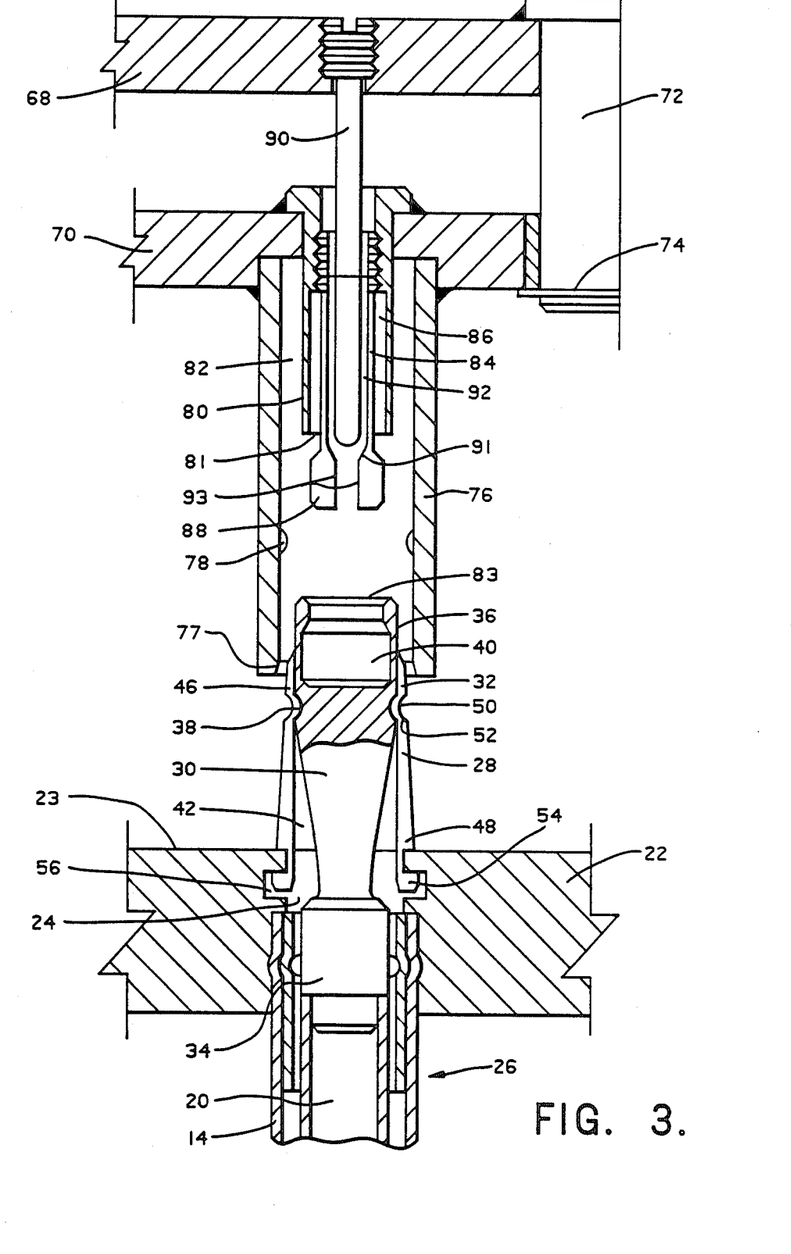
FIG. 3 is an enlarged, detailed sectional view of a portion of a gripper assembly constructed in accordance with the present invention including an absorber rod extending in a guide thimble with the releasable latching structure of the absorber rod securing the absorber rod to the top nozzle adapter plate.
Figure 4:
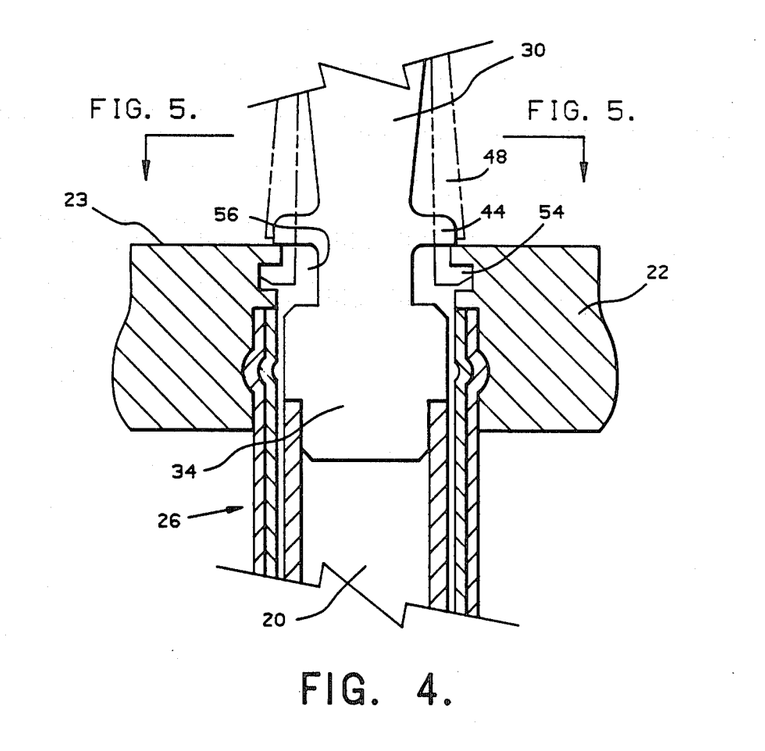
FIG. 4 is an enlarged elevational view of the lower portion of the releasable latching structure shown in FIG. 3 rotated 90 degrees.
Figure 6:
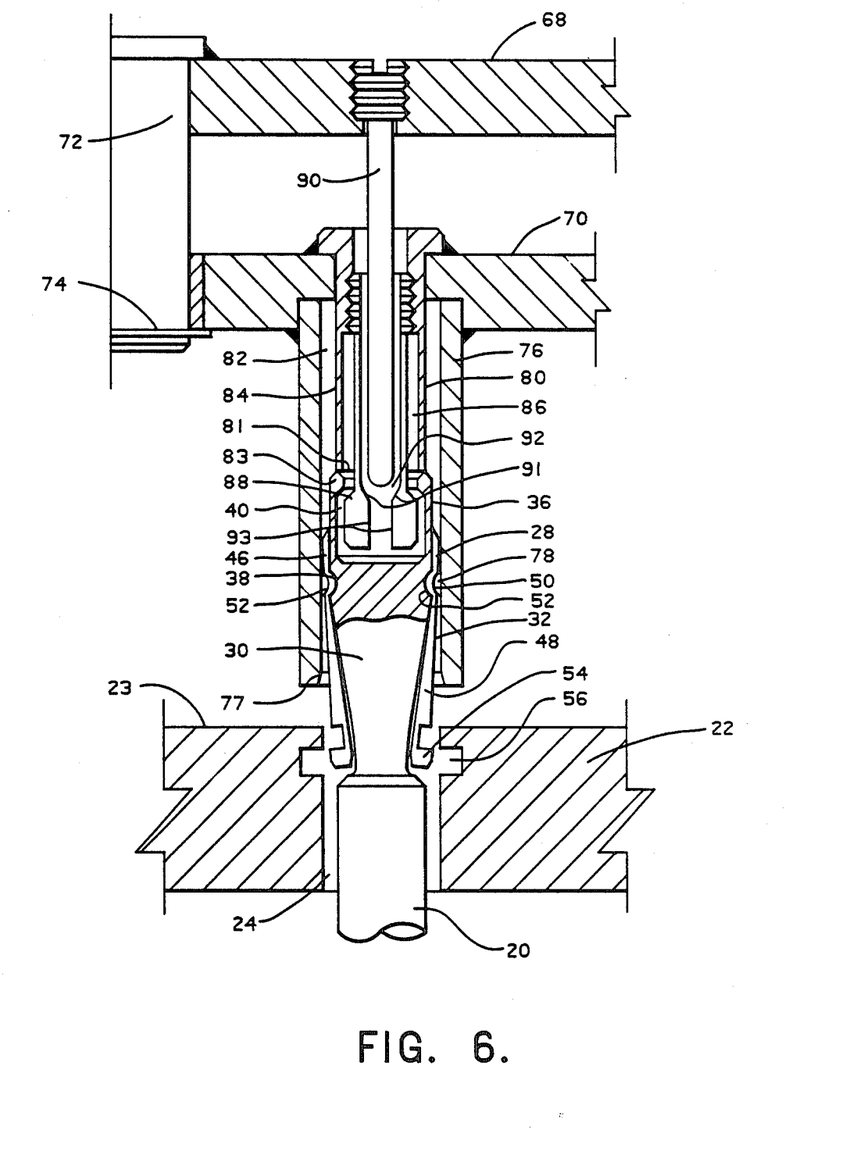
FIG. 6 is an enlarged detailed elevational view of the gripper assembly as shown in FIG. 3 of the present invention showing the actuating sleeve, in section, extended downwardly along the spring latch so as to forcibly engage and deflect all of the latch fingers of the spring latch inward to their unlatched positions and showing the gripper flexures disposed within an undercut cavity in the top portion of the mounting body of the releasable latching structure.
Figure 7:
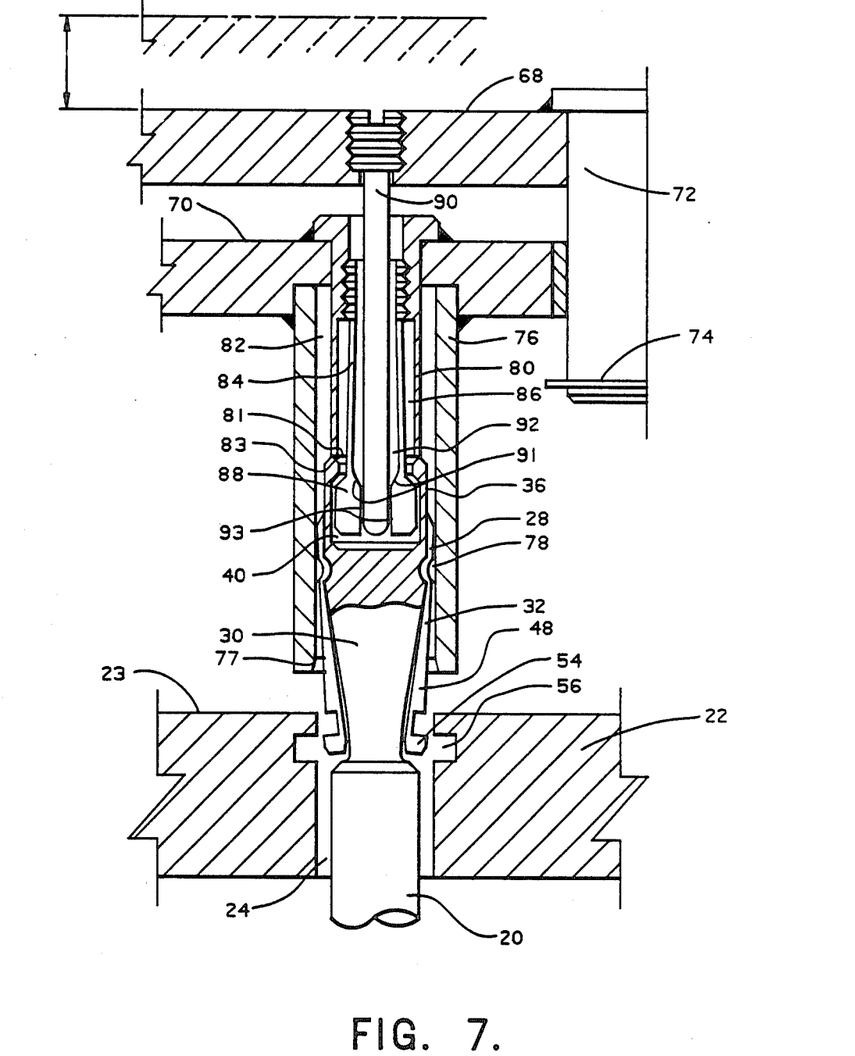
FIG. 7 is an enlarged detailed elevational view of the gripper assembly as shown in FIGS. 3 and 6 showing the actuating sleeve, in section, the gripper flexures disposed within an undercut cavity in the top portion of the mounting body of the releasable latching structure and showing the actuator rod in a lowered position thus forcibly extending grippers outwardly so as to engage the sides of the undercut cavity of the mounting body.
Figure 8:
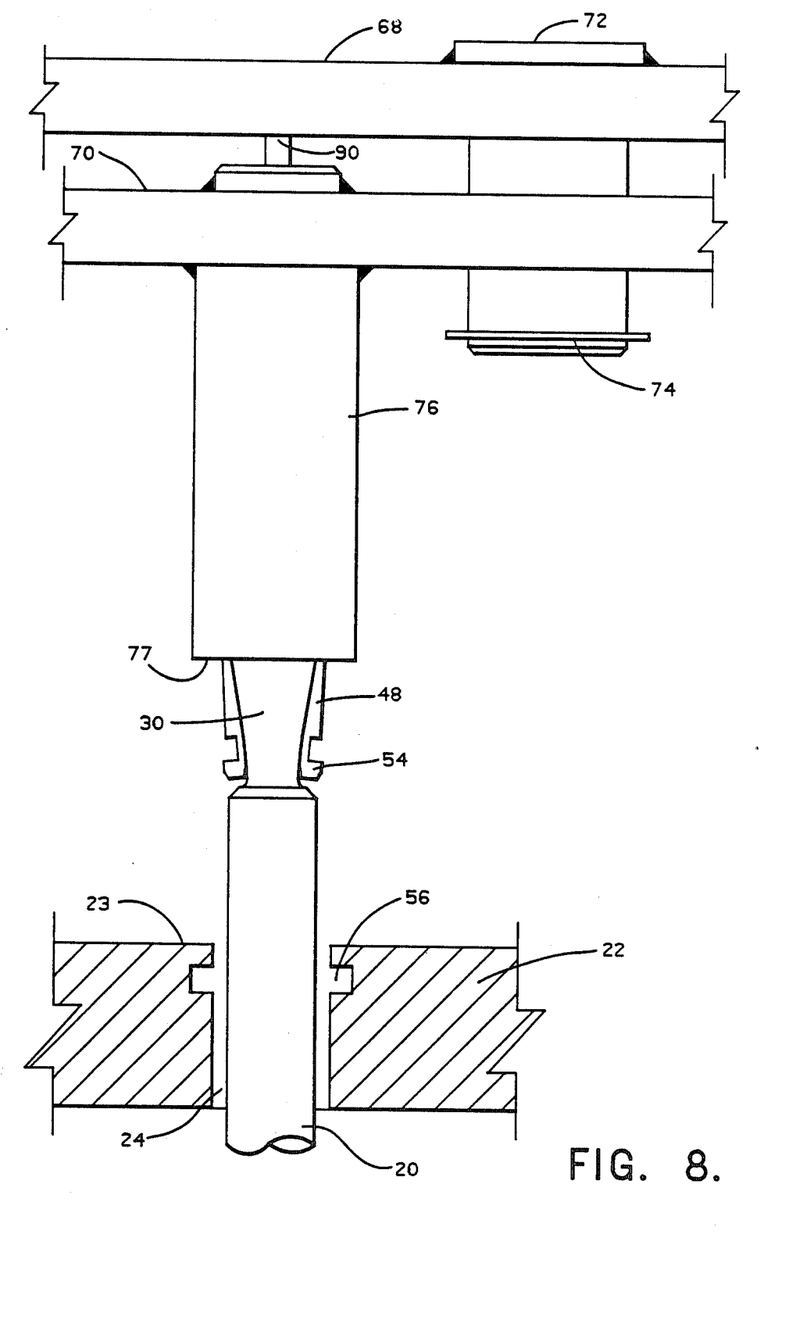
FIG. 8 is an enlarged elevational view of the gripper assembly as seen in FIGS. 3, 6 and 7 showing the releasable absorber rod being removed from the fuel assembly.

The latch fingers 48 have external latching keys 54 defined on their lower ends and are radially deflectible toward and away from the mounting body 30 between a outer latching position as seen in FIG. 3 and an inner unlatching position as seen in FIGS. 6, 7 and 8. The normal relaxed position to which each of the fingers 48 is biased to return is the latching position. When releasable latching structure 28 is holding absorber rods 20 in place within guide thimbles 14, latch fingers 48 are in their outer latching position and the latching keys 54 are engaged within recess 56 of a passageway 24 in adapter plate 22.

As shown in FIG. 1, gripper assembly 10 is housed within support frame 58, which is disposed above fuel assembly 12. Gripper assembly 10 is attached to the lower portion of mast 60 by a bracket 62. Mast 60 is moved vertically between an upper and lower position by a mechanism, not shown, to raise and lower gripper assembly 10 with respect to fuel assembly 12. Comb assembly 64 provides some guidance and support for absorber rods 20 as they are raised from or lowered into fuel assembly 12. A recess is provided in each of the four lower corners of frame 58 to receive a guide pin 66, mounted on top of the fuel assembly 12 to orient the frame 58 as it is lowered onto fuel assembly 12 for use.

As shown in FIGS. 2, 3, 6, 7 and 8, the gripper assembly 10 of the present invention includes actuator plate 68 and lower plate 70 disposed below and spaced apart from actuator plate 68. Actuator plate 68 is movable vertically with respect to lower plate 70 between a first distance and a closer second distance. A center support 72 is fixedly secured to actuator plate 68 and extends through bores in the center of both actuator plate 68 and lower plate 70, thus securing the plates 68 and 70 together. Center support 72 includes a circumferential flange 74 at its lower end which is capable of supporting lower plate 70 when the gripper assembly 10 is not engaging an absorber rod 20.

Lower plate 70 includes a plurality of hollow cylindrical actuating sleeves 76 extending downwardly from lower plate 70. Actuating sleeves 76 are spaced so that they will extend over an absorber rod 20 as gripper assembly 10 is lowered over fuel assembly 12. Actuating sleeves 76 are of a size appropriate for causing keys 54 of latch fingers 48 to disengage from adapter plate 22 of the top nozzle 18 of the fuel assembly 12 as an actuating sleeve 76 is lowered over an absorber rod 20. Each actuating sleeve 76 further includes an annular circumferential bulge 78 on its inner surface which engages an annular circumferential groove 50 of a spring latch 32 as actuating sleeves 76 are lowered over absorber rods 20.

Hollow cylindrical positioning sleeves 80 are attached to lower plate 70 and extend part way through the hollow portions 82 of actuating sleeves 76. The bottom surface 81 of each positioning sleeve 80 rests on the upper surface 83 of a mounting body 30 of a releasable latching structure 28 when gripper assembly 10 is lowered over absorber rods 20. Contact between bottom surfaces 81 of positioning sleeves 80 and the upper surfaces 83 of mounting bodies 30 prevents further downward motion of gripper assembly 10.

Gripper flexures 84 extend through the hollow portions 86 of positioning sleeves 80 past the bottom surfaces 81 of positioning sleeves 80. Gripper flexures 84 include grippers 88 which are received within undercut cavities 40 of mounting bodies 30 as gripper assembly 10 is lowered over absorber rods 20.

Actuator rods 90 extend from actuator plate 68 downwardly through hollow portions 92 between gripper flexures 84. As actuator plate 68 moves downwardly with respect to lower plate 70 between the first and second distance, actuator rod 90 contacts shoulders 91 and then inner surfaces 93 of grippers 88 to spread grippers 88 of gripper flexures 84 apart. Thus, when grippers 88 of gripper flexures 84 are disposed within undercut cavities 40 of mounting bodies 30, actuator rods 90 spread grippers 88 of gripper flexures 84 apart to securely engage the sides of undercut cavities 40.

Figure 9:
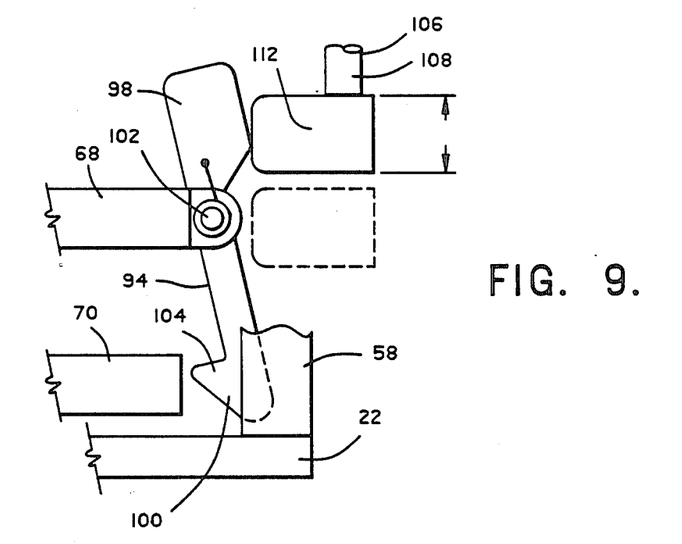
FIG. 9 is a schematic view of the latching mechanism of a gripper assembly showing the actuator in its operating position in contact with the latch releasing the lower plate from the adapter plate.
Figure 10:
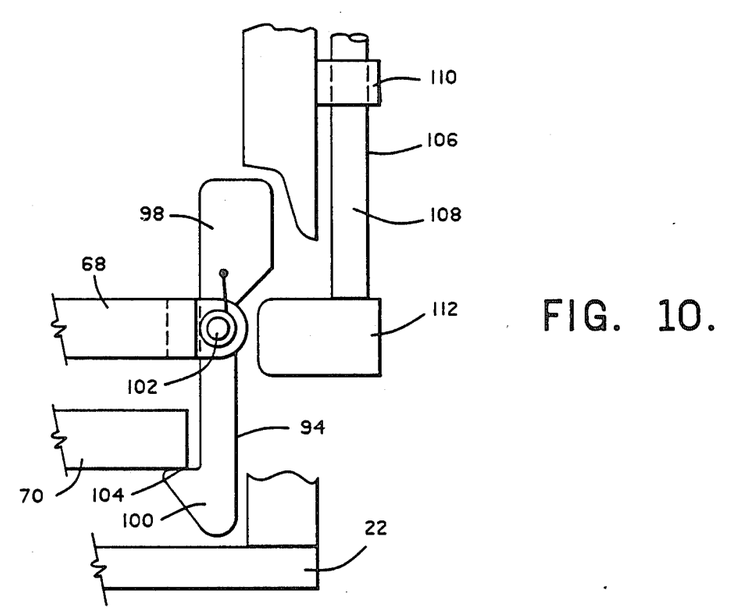
FIG. 10 is a schematic view of the latching mechanism of a gripper assembly showing the adapter plate and lower plate secured together by the latching mechanism and the actuator in its lowered position.

As shown in FIGS. 1, 2, 9 and 10, a plurality of latches 94 are attached to actuator plate 68 by pins 96. Each latch includes upper and lower fins 98 and 100, respectively. Latches 94 are normally biased in the locked position by a torsion spring 102. Lower fins 100 of latches 94 include flat shelf portions 104, which support lower plate 70 when latches 94 are oriented in the locked position and the distance between actuator plate 68 and lower plate 70 is the second distance (FIG. 10).

Actuators 106 are used to release latches 94 from their locked positions. Actuators 106 include a stem portion 108 by which actuators 106 are attached to frame 58 through mounting means 110. Enlarged portions 112 at the lower ends of stems 108 contact upper fins 98 of latches 94 to unlock latches 94 (FIG. 9). Actuators 106 are attached to frame 58 so that they are movable along a vertical path between a lower, normal position (FIG. 10) and a raised, operating position (FIG. 9). Actuators 106 can be activated only when the gripper assembly 10 is at the lower end of its travel.

In order to remove an absorber rod 20 from the top nozzle 18 of a fuel assembly 12, the gripper assembly 10 is lowered onto fuel assembly top nozzle 18. Actuator plate 68 and lower plate 70 are held in a first spaced relationship. Actuator plate 68 is supported by bracket 62 and lower plate 70 is supported by flange 74 of center support 72. As the gripper assembly 10 is lowered onto fuel assembly top nozzle 18, actuating sleeves 76 are lowered over releasable latching structures 28, which are releasably securing absorber rods 20 to adapter plate 22 of top nozzle 18 (FIG. 3). As each actuating sleeve 76 moves down over a releasable latching structure 28, an annular circumferential bulge 78 of an actuating sleeve 76 is eventually retained within an annular circumferential groove 50 of an outer ring portion 46 of a spring latch 32. Fingers 48 of each spring latch 32 are gradually forced inward toward a mounting body 30 until the latching keys 54 are disengaged from a recess 56 in passageway 24 in adapter plate 22. At the same time, each gripper flexure 84 gradually enters an undercut cavity 40 of a mounting body 30. Downward movement of gripper assembly 10 stops when the bottom surfaces 81 of positioning sleeves 80 contact the uppermost surfaces 83 of the upper end portions 36 of mounting bodies 30 of releasable latching structures 28 (FIG. 6). Use of positioning sleeves 80 prevents gripper flexures 84 from bottoming out in the undercut cavities 40 of the releasable latching structures 28, thus ensuring smooth operation of the gripper flexures 84.

The actuator plate 68 is then lowered with respect to lower plate 70. As actuator plate 68 is lowered, each actuating rod 90 gradually enters hollow portions 92 between gripper flexures 84 contacts shoulders 91 and then inner surfaces 93 of grippers 88 and gradually pushes grippers 88 apart to a position wherein the grippers 88 of gripper flexures 84 are securely engaged within undercut cavities 40 of mounting bodies 30 of releasable latching structures 28 (FIG. 7). Absorber rods 20 can then be withdrawn from guide thimbles 14 and removed from the fuel assembly 12 by raising the gripper assembly 10 (FIG. 8).

The actuator plate, 68 and the lower plate 70 are held together in this closer, spaced relationship as the gripper assembly 10 is raised by latches 94. After lower plate 70 reaches its lowest point of travel, actuators 106 are raised to their operating position (FIG. 9). As the actuator plate 68 is lowered with respect to the lower plate 70, so that gripper flexures 84 securely engage absorber rods 20, actuators 106 contact upper fins 98 of latches 94 causing latches 94 to rotate counterclockwise (FIG. 9). As a result, flat shelf portions 104 of latches 94 clear the top surface and outer edges of lower plate 70 and snap under lower plate 70 so that flat shelf portions 104 of latches 94 support the lower surface of lower plate 70 (FIG. 10).

In order to insert an absorber rod into the fuel assembly top nozzle 18, the gripper assembly 10 is lowered onto fuel assembly top nozzle 18 with actuator plate 68 and lower plate 70 held in their second spaced apart relationship with latches 94 in their locked position and flat shelf portions 104 of latches 94 supporting the lower plate 70. Absorber rods 20 are secured by gripper assembly 10 as actuator rods 90 are disposed within hollow portions 92 between gripper flexures 84 keeping grippers 88 in their spaced apart position so that they are securely engaged within cavities 40 of mounting bodies 30 of releasable latching structures 28. Downward movement of gripper assembly 10 stops when the bottom surfaces 77 of actuating sleeves 76 contact the upper surface 23 of top nozzle adapter plate 22. In this position, absorber rods 20 are inserted within passageways 24 of top nozzle adapter plate 22 but are still secured by grippers 88 of gripper assembly 10 (FIG. 7). Actuators 106 are then raised until they contact upper fins 98 of latches 94 causing latches 94 to rotate counterclockwise (FIG. 9). As a result, flat sheet portions 104 of latches 94 clear the lower surface and outer edges of lower plate 70 releasing lower plate 70 (FIG. 9). As gripper assembly 10 is raised, actuator plate 68 is raised with respect to lower plate 70 until actuator plate 68 and lower plates 70 are in their first spaced apart relationship whereby actuator plate is supported by bracket 62 and lower plate 70 is supported by flange 74 on center support 72. As actuator plate 68 is raised with respect to lower plate 70, actuator rods 90 are withdrawn from recesses 92 between gripper flexures 84 so that grippers 88 no long securely engage undercut cavities 40 of mounting bodies 30 of releasable latching mechanisms 28 (FIG. 6). Further upward movement of the gripper assembly 10 raises actuator sleeves 76 from the upper surface of top nozzle adapter plate 22. As actuator sleeves 76 are raised, latch fingers 48 of releasable latching structure 28 are released and keys 54 of latch fingers 48 engage recesses 56 in passageway 24 in adapter plate 22, thus, securing absorber rods 20 to top nozzle adapter plate 22 through releasable latching structures 28 (FIG. 3).

I claim:

1. In combination with an elongated member having a releasable latching structure disposed at one end thereof, said latching structure having at least one latching member adapted to be movable between a latched position in which said latching member is able to releasably engage the adapter plate of the top nozzle of a nuclear reactor fuel assembly and secure said elongated member in a stationary relationship with respect to said adapter plate, and an unlatched position in which said latching member is able to disengage from said adapter plate so that said elongated member can be removed from said fuel assembly, apparatus comprising:
  a releasing member, adapted to coact wtih said latching structure to move said latching member of said latching structure between said latched position and said unlatched position, and said releasing member having a hollow portion therethrough;
  an engaging member connected to said releasing member and extending downwardly through said hollow portion of said releasing member; and
  an actuating member extending downwardly through said hollow portion of said releasing member and coacting with said engaging member to releasably engage said latching structure.

2. The apparatus of claim 1 wherein said releasing member is coaxially slidable over said latching structure.

3. The apparatus of claim 2 wherein said releasing member is a cylindrical sleeve.

4. The apparatus of claim 1 wherein said latching structure has an undercut cavity in its upper surface and said engaging member is adapted to be secured within said undercut cavity in order to releasably engage said latching structure.

5. The apparatus of claim 4 wherein said engaging member is a plurality of gripper flexures extending downwardly through said hollow portion of said releasing member and adapted to be received within said undercut cavity and said actuating member is a rod extending downwardly between said gripper flexures so that when said gripper flexures are disposed within said undercut cavity said actuator rod coacts with said gripper flexures so that said gripper flexures engage said latching structure.

6. The apparatus of claim 4 wherein said releasing member is coaxially slidable over said latching structure.

7. The apparatus of claim 5 wherein said releasing member is coaxially slidable over said latching structure.

8. The apparatus of claim 6 wherein said releasing member is a cylindrical sleeve.

9. In combination with a plurality of elongated members, each said elongated member having a releasable latching structure disposed at one end thereof, each said latching structure having at least one latching member adapted to be movable between a latched position in which said latching member is able to releasably engage the adapter plate of the top nozzle of a nuclear reactor fuel assembly and secure a said elongated member in a stationary relationship with respect to said adapter plate, and an unlatched position in which said latching member is able to disengage from said adapter plate so that the said elongated member can be removed from said fuel assembly, apparatus for inserting and removing said elongated members from said nuclear reactor fuel assembly comprising:
  a frame;
  first and second plates disposed within said frame, said second plate disposed below and spaced apart from said first plate, at least one of said first and second plates being capable of vertical movement relative to the other;
  means for moving said frame toward and away from said fuel assembly;
  means for moving said first and second plates within said frame toward and away from said adapter plate of said top nozzle of said fuel assembly;
  means for varying the vertical distance between said first and second plates between a first distance and a decreased second distance;
  means associated with said first and second plates for maintaining said first and second plates in a position whereby the vertical distance between said plates is said second distance;
  a releasing member extending downwardly from said second plate, adapted to coact with said latching structure of a said elongated member to move said latching member of said latching structure between said latched position and said unlatched position, and said releasing member having a hollow portion therethrough;
  an engaging member connected to said releasing member and extending downwardly from said second plate through said hollow portion of said releasing member; and
  an actuating member extending downwardly from said first plate through said hollow portion of said releasing member and coacting with said engaging member to releasably engage said latching structure when the vertical distance between said first and second plates is said second distance.

10. The apparatus of claim 9 wherein said releasing member is coaxially slidable over said latching structure.

11. The apparatus of claim 10 wherein said releasing member is a cylindrical sleeve.

12. The apparatus of claim 9 wherein said latching structure has an undercut cavity in its upper surface and said engaging member is adapted to be secured within said undercut cavity in order to releasably engage said latching structure.

13. The apparatus of claim 12 wherein said engaging member is a pair of gripper flexures extending downwardly through said hollow portion of said releasing member and adapted to be received within said undercut cavity and said actuating member is a rod extending downwardly from said first plate between said gripper flexures so that when said gripper flexures are disposed within said undercut cavity said actuator rod coacts with said gripper flexures so that said gripper flexures engage said latching structure.

14. The apparatus of claim 12 wherein said releasing member is coaxially slidable over said latching structure.

15. The apparatus of claim 13 wherein said releasing member coaxially is slidable over said latching structure.

16. The apparatus of claim 14 wherein said releasing member is a cylindrical sleeve.

* * * * *